(12) United States Patent
Bracken et al.

(10) Patent No.: US 12,117,579 B1
(45) Date of Patent: Oct. 15, 2024

(54) METHOD FOR FREQUENCY IDENTIFICATION

(71) Applicant: Solinas Technologies Inc., Oakville (CA)

(72) Inventors: Marc Bracken, Toronto (CA); Declan Bracken, Toronto (CA); Antonio Laranjo da Costa, Rocky View County (CA); Alyssa Natasha McIntosh da Costa, Rocky View County (CA)

(73) Assignee: Solinas Technologies Inc., Oakville (CA)

( * ) Notice: Subject to any disclaimer, the term of this patent is extended or adjusted under 35 U.S.C. 154(b) by 0 days.

(21) Appl. No.: 18/643,540

(22) Filed: Apr. 23, 2024

(30) Foreign Application Priority Data

Apr. 12, 2024 (CA) ........................ 3235071

(51) Int. Cl.
  *G01V 1/30* (2006.01)
(52) U.S. Cl.
  CPC ........ *G01V 1/307* (2013.01); *G01V 2210/121* (2013.01); *G01V 2210/1295* (2013.01); *G01V 2210/1425* (2013.01)

(58) Field of Classification Search
  CPC ............. G01V 1/307; G01V 2210/121; G01V 2210/1295; G01V 2210/1425
  See application file for complete search history.

(56) References Cited

U.S. PATENT DOCUMENTS 12,000,801 B1 * 6/2024 Bracken ................ G01N 29/46

* cited by examiner

*Primary Examiner* — Daniel Pihulic
(74) *Attorney, Agent, or Firm* — Hartman Global IP Law; Gary M. Hartman; Domenica N. S. Hartman

(57) ABSTRACT

A method for identifying a frequency producing a dominant vibration response of an underground structure includes the steps of inducing controlled acoustic waves in the structure via ground, the acoustic waves varying over a predetermined frequency range, measuring vibration response associated with the structure in response to the controlled acoustic waves over the predetermined frequency range, using a measurement device in vibrational communication with the structure, detecting a dominant vibration response among measurements across all frequencies of the predetermined frequency range, and, identifying a frequency of the predetermined frequency range which produced the dominant vibration response.

23 Claims, 5 Drawing Sheets

METHOD FOR FREQUENCY IDENTIFICATION

The present invention relates to identification of a frequency producing a dominant vibration response in an underground structure and, more particularly, to identification of a frequency producing a dominant vibration response useful for locating an underground structure, such as a pipe.

BACKGROUND

Underground structures such as pipes are important for modern infrastructure. They facilitate the transport of various essential services and a broad spectrum of utilities including the distribution of potable water, the disposal of wastewater, the transmission of natural gas, and the protection and routing of electrical and telecommunications cables. It is important to know the location of underground pipes for planning of repair or maintenance and for avoiding impact or damage to the pipe during digging operations.

Metallic pipes may be located using electromagnetic locators, which are widely available. These electromagnetic locators work by transmitting an electromagnetic signal into the ground, which then interacts with metallic pipes, causing a detectable signal to bounce back. This method, while effective for metallic pipes, does not work with non-metallic materials due to their lack of conductivity. A number of other types of devices exist which use ground penetrating radar and alternate acoustic methods to locate non-metallic underground pipe. Non-metallic pipes may include, but are not limited to, plastic gas service pipes, plastic or asbestos cement water pipes, and plastic or clay sewer connection pipes. While many non-metallic pipes are installed with a tracer wire to allow the use of electromagnetic locators, many pipes were either not installed with wire, or the wire connection has broken making them difficult to locate.

Previous methods of locating underground pipes have used ground excitation methods that pick up on pipe appurtenance. However, these methods are also not sufficiently accurate and often rely on readings from metallic structures. Moreover, at certain distances between a ground exciter and a pipe, acoustic waves can interact in the ground to interfere with the vibration response, leading to inaccurate measurement of pipe location. This effect can be exacerbated at some frequencies by factors such as type of soil, the type of pipe, whether it is water or gas filled, depth of pipe, and soil layering, to name a few.

It is desirable to have a method for accurately and efficiently locating underground structures, such as pipes, regardless of their material composition.

BRIEF SUMMARY

The present invention relates to identification of a frequency producing a dominant vibration response in an underground structure and, more particularly, to identification of a frequency producing a dominant vibration response useful for locating an underground structure, such as a pipe.

In one aspect, there is provided a method for identifying a frequency producing a dominant vibration response of an underground structure. Controlled acoustic waves are induced in the structure via ground, the acoustic waves varying over a predetermined frequency range. Vibration response associated with the structure in response to the controlled acoustic waves over the predetermined frequency range is measured, using a measurement device in vibrational communication with the structure. A dominant vibration response among measurements across all frequencies of the predetermined frequency range is detected. A frequency of the predetermined frequency range which produced the dominant vibration response is identified. The underground structure may be non-metallic. The underground structure may be a pipe. The controlled acoustic waves may be induced using a vibration exciter. The vibration response may be measured using at least one of a velocity-based vibration sensor and a low-frequency accelerometer.

In one aspect, the acoustic waves vary over the predetermined frequency range by inducing controlled acoustic waves according to at least one of a stepped sine function and a swept sine function. In another aspect, the acoustic waves vary over the predetermined frequency range by inducing controlled acoustic waves using a band-passed noise source.

In one aspect, the detecting step further includes converting the vibration response from a time-domain vibration response to a frequency-domain vibration response by applying a Fourier transform, and, analyzing the frequency-domain vibration response to identify the dominant vibration response.

In one aspect, the method includes the steps of repositioning the exciter, and, returning to the inducing step, where the inducing step further includes inducing controlled acoustic waves in the structure via ground at a plurality of locations about the structure, and, the detecting step further includes detecting the dominant vibration response across all frequencies of the predetermined frequency range from all locations of the plurality of locations.

The dominant vibration response values may be instantaneous peak vibration response values at each frequency. A number of instantaneous peak vibration response values considered in the Fourier transform may be determined by a resolution of the Fourier transform.

The frequency-domain vibration responses may include peak vibration responses corresponding with each frequency in the frequency-domain which are analyzed to identify a highest peak vibration response from among the peak vibration responses as the dominant vibration response.

In one aspect, there is provided a system for identifying a frequency producing a dominant vibration response of an underground structure. The system includes an exciter for inducing in the structure, via ground, controlled acoustic waves which vary over a predetermined frequency range, a measurement device in vibrational communication with the structure for measuring vibration response associated with the structure in response to the controlled acoustic waves over the predetermined frequency range, and, a vibration signal analyzer for detecting a dominant vibration response across all frequencies of the predetermined frequency range and identifying a frequency of the predetermined frequency range which produces the dominant vibration response.

In one aspect, the vibration signal analyzer converts the vibration response from a time-domain vibration response to a frequency-domain vibration response by applying a Fourier transform and analyzes the frequency-domain vibration response to identify the dominant vibration response.

In one aspect, the exciter is repositionable for inducing controlled acoustic waves in the structure via ground at a plurality of locations about the structure, and, the vibration signal analyzer detects the dominant vibration response across all frequencies of the predetermined frequency range from all locations of the plurality of locations.

The dominant vibration response values may be instantaneous peak vibration response values at each frequency. A number of instantaneous peak vibration response values considered in the Fourier transform may be determined by a resolution of the Fourier transform.

In one aspect, there is provided a method for locating an underground structure. At a plurality of locations about the structure, controlled acoustic waves are induced in the structure via ground, the controlled acoustic waves varying over a predetermined frequency range. Vibration response associated with the structure in response to the controlled acoustic waves over the predetermined frequency range is measured, using a measurement device in vibrational communication with the structure. A dominant vibration response across all frequencies of the predetermined frequency range from all locations of the plurality of locations is detected. A frequency of the predetermined frequency range which produces the dominant vibration response is identified. The underground structure is located as at a location of the plurality of locations where the dominant vibration response is produced at the frequency.

In one aspect, the method includes the steps of converting the vibration response from a time-domain vibration response to a frequency-domain vibration response by applying a Fourier transform, and, analyzing the frequency-domain vibration response to identify the dominant vibration response.

In one aspect, the analyzing step further includes analyzing peak vibration responses corresponding with each frequency in the frequency-domain, and, identifying a highest peak vibration response from among the peak vibration responses as the dominant vibration response.

The analyzing step may further include analyzing peak vibration responses corresponding with each frequency in the frequency-domain, and, identifying a highest peak vibration response from among the peak vibration responses as the dominant vibration response. The dominant vibration response values may be instantaneous peak vibration response values at each frequency. A number of instantaneous peak vibration response values considered in the Fourier transform may be determined by a resolution of the Fourier transform.

In one aspect, the method includes the steps of repositioning the exciter, and, returning to the inducing step, where the inducing step further includes inducing controlled acoustic waves in the structure via ground at a plurality of locations about the structure, and, the detecting step further includes detecting the dominant vibration response across all frequencies of the predetermined frequency range from all locations of the plurality of locations.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The present invention relates to identification of a frequency producing a dominant vibration response in an underground structure and, more particularly, to identification of a frequency producing a dominant vibration response useful for locating an underground structure, such as a pipe.

Aspects described herein include a system and method for identifying a frequency producing a dominant vibration response of an underground structure and a method for locating an underground structure using the dominant vibration response produced at the frequency.

Figure 1:
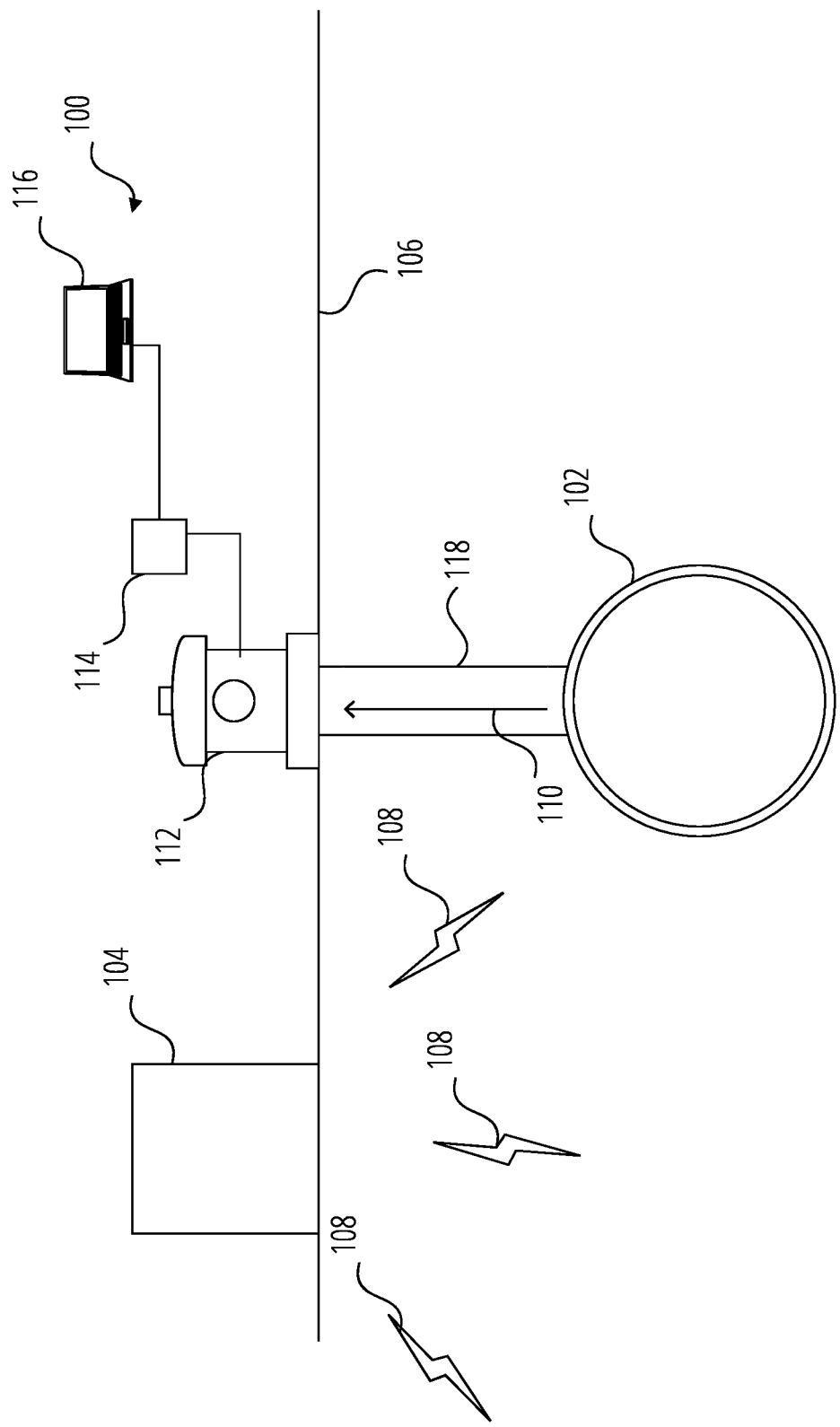
FIG. 1 illustrates a system for identifying a frequency producing a dominant vibration response of an underground structure, in accordance with one aspect.

In FIG. 1, there is shown a system 100 for a frequency producing a dominant vibration response in a structure 102 located underground. According to the aspect shown in FIG. 1, structure 102 is a pipe. However, it should be understood that other structures may be located using the aspects described herein. Structure 102 may be located several meters underground and may be composed of any material suitable for long-term use in an underground environment. Materials for a structure 102 such as a pipe may include various metals such as steel, aluminum or lead or non-metallic materials such as plastic, asbestos cement or clay. The present invention is particularly advantageous for locating non-metallic structures as it does not depend on the material composition of the structure.

System 100 includes an exciter 104 for inducing controlled acoustic waves 108 in ground 106. Ground 106 may be any ground material, such as soil or pavement, for example. The exciter 104 refers to a device that generates controlled vibrations in the form of acoustic waves 108. Exciter 104 may be a physical shaker configured to induce vibrations in ground or soil through direct physical contact therewith. Preferably exciter 104 is configured to induce vibrations across a range of frequencies and amplitudes. Exciters 104 work by using an electromechanical mechanism to convert electrical energy into mechanical vibrations. One non-limiting example of an exciter is the electrodynamic shaker, which uses a coil in a magnetic field to create force. When an electrical signal is applied to the coil, it moves in the magnetic field and creates a force that is transferred to the structure being vibrated. The exciter 104 is positioned in vibrational communication with the structure 102 and uses the ground 106 as a medium for transferring acoustic waves 108 to structure 102.

In one aspect, the exciter 104 generates a swept sine wave vibration that continuously increases in frequency from 30 Hz to 200 Hz. In another aspect, the exciter 104 generates a stepped sine function that increases frequency from 30 Hz to 200 Hz incrementally. In yet another aspect, the exciter 104 generates a band limited noise signal containing frequency components from 30 Hz to 200 Hz.

The acoustic waves 108 induced by exciter 104 travel through ground 106 and induce vibration in structure 102. Structure 102 generates a vibration response 110 in response to the acoustic waves 108. The vibration response 110 is conveyed via conduit 118 or via ground 106 to a receiver 112. In one aspect, the receiver 112 is a fire hydrant, gas meter or other similar component that is in vibrational communication with the structure 102. Receiver 112 has in communication therewith a measurement device 114 for measuring the vibration response 110. While there is only one measurement device 114 shown in FIG. 1, any number of measurement devices 114 may be positioned above ground 106 to measure vibration response 110 of structure 102.

In one preferred aspect, exciter 104 is repositionable about the structure 102 so that vibrations may be induced in structure 102 from a plurality of locations about structure 102. This allows for location of the structure 102 based on a peak signal level at some location to which the exciter 104 has been repositioned.

In one aspect, measurement device 114 is a vibration transducer which can be used to detect vibration response 110 associated with structure 102 in response to the controlled acoustic waves 108 generated by exciter 104. The vibration transducer, also referred to as a vibration sensor, is a device that converts mechanical vibrations into an electrical signal that can be measured and analyzed. In one preferred aspect, measurement device 114 is a velocity type sensor which incorporates a magnet and coil to output a voltage proportional to the vibration. This type of measurement device may be referred to as a "geophone." This type of sensor is suitable for measurement at low frequencies and provides several advantages, including a low noise floor, high sensitivity, and natural rejection of higher frequency noise. In another preferred aspect, measurement device 114 is an accelerometer, such as a low-frequency accelerometer.

In the aspect shown in FIG. 1, measurement device 114 is in data exchange communication with vibration signal analyzer 116. Vibration signal analyzer 116 processes and analyzes the vibration response 110 measurements taken by measurement device 114. Vibration signal analyzer 116 measures the frequency spectrum or the amplitude of a signal as a function of frequency. Vibration signal analyzer 116 may have an on-board display or may be coupled with an external display for displaying results of analyses of the vibration response 110. In the aspect wherein exciter 104 is repositionable to other locations about the structure, measurement device 114 receives vibration response 110 from all locations of the plurality of locations and vibration signal analyzer 116 processes and analyzes the vibration response 110 from all locations of the plurality of locations.

In one aspect, the vibration signal analyzer 116 includes a data acquisition system (not shown) for obtaining vibration signals from the measurement device 114. The vibration signals may be processed and analyzed using either MATLAB™ or software within the data acquisition system. In another aspect, the vibration signal analyzer 116 is a real-time analyzer which can analyze and process the vibration signals from the measurement device 114 in real-time. The real-time analyzer can be a hardware device, or it can be a software application running on a computer, tablet, smartphone, or the cloud.

In one preferred aspect, the real-time analyzer is a Fourier transform analyzer and preferably a Fast Fourier Transform (FFT) analyzer for analyzing the measured vibration response 110 of structure 102 in real-time. FFT analyzers use an FFT algorithm to provide a detailed analysis of the obtained signal data. The FFT algorithm can be used to convert the time-domain vibration signal into the frequency domain and identify the frequencies present in the measured vibration data and analyze their magnitudes.

Figure 2:
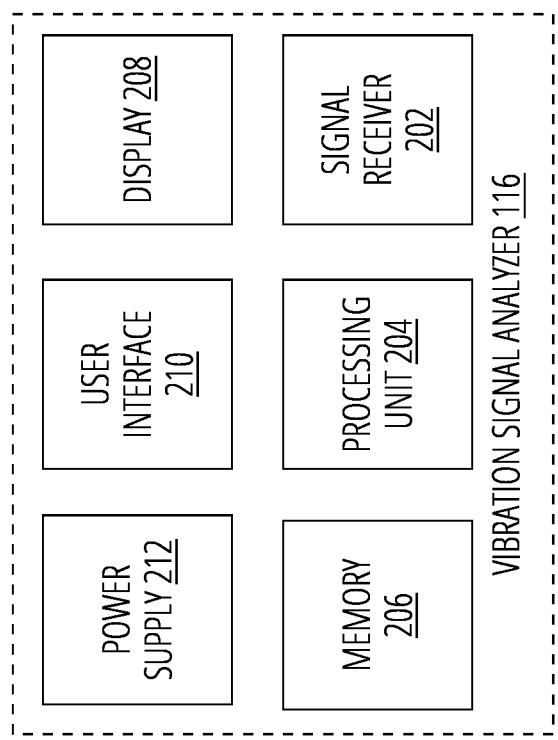
FIG. 2 illustrates a vibration signal analyzer, in accordance with one aspect.

FIG. 2 illustrates a schematic representation of a vibration signal analyzer 116, according to one aspect. The vibration signal analyzer 116 may be in the form of a stand-alone computing device or may be integrated within a multi-purpose computing device or may be partly or fully embodied in a cloud computing environment.

In one aspect, vibration signal analyzer 116 collects data relating to vibration response 110 measured by measurement device 114 and downloads this data to a computer application or uploads it to a cloud system where the analysis is completed either in real-time or at a later time. Thus the vibrational signal analysis may be conducted partially or fully either on-site or off-site from the location where the vibrational vibration response 110 is being measured. Accordingly, components of the vibration signal analyzer 116 may be co-located or may be distributed among multiple locations and communicatively coupled with one another.

In the preferred aspect of FIG. 2, vibration signal analyzer 116 analyzes the vibration response 110 measurements in real-time. The vibration signal analyzer 116 includes a signal receiver 202 for receiving the measured vibration signals from measurement device 114. The signal receiver 202 converts the vibration signals into digital data that is sent to a processing unit 204 for further processing. Processing unit 204 executes a series of computer-readable instructions for real-time analysis of vibration response 110.

Processing unit 204 preferably uses Fast Fourier Transform (FFT) or similar techniques to analyze the vibration response 110. As is further discussed hereinafter, vibration response 110 is measured in the time domain and the FFT transforms the time-domain signals into its representation in the frequency domain.

Vibration signal analyzer 116 further includes memory 206 which may be used to store measured vibration response 110 signals and processed vibration data. Display 208 provides visual representation of the analysis and/or results thereof so that it may be reviewed by a user (not shown). Display 208 may be remote to the vibration signal analyzer 116, in data exchange communication therewith via a wireless connection.

Vibration signal analyzer 116 further includes user interface 210 which allows users to interact directly with and make real-time adjustments to the operation of vibration signal analyzer 116. The user interface 210 may include physical controls or buttons for adjusting various parameters and settings including frequency range selection, input gain adjustment, resolution bandwidth settings, display preferences, and other related parameters. User interface 210 may be remote to the vibration signal analyzer 116, in data exchange communication therewith via a wireless connection.

Power supply 212 provides power to the vibration signal analyzer 116. Power supply 212 may be connected with an on-board power source such as a battery or may be connected with external power via a separate component such as a power adapter for relaying power to the power supply 212.

Figure 3:
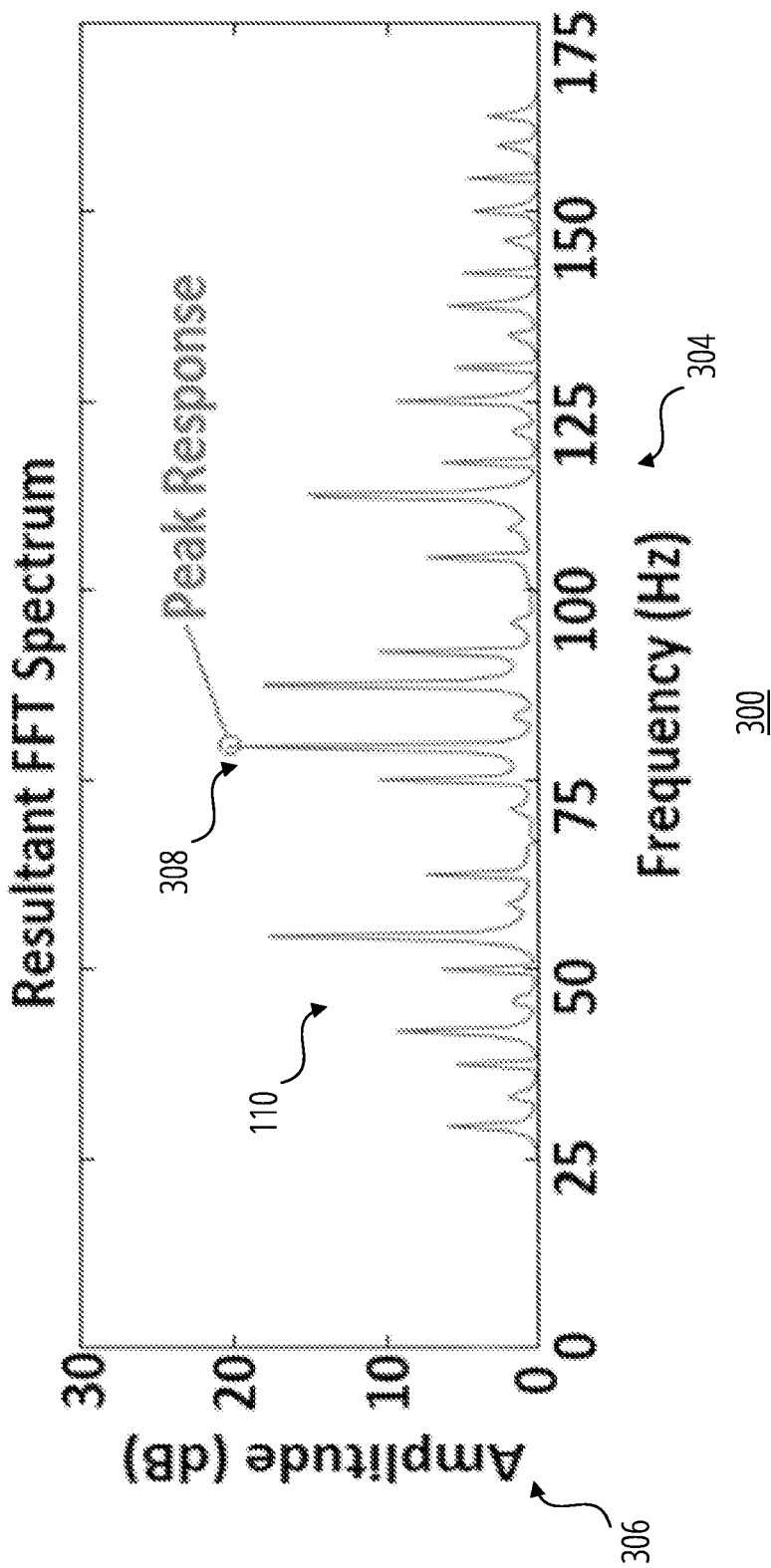
FIG. 3 illustrates measured vibration response in the frequency domain, in accordance with one aspect.

In FIG. 3, there is shown a graph 300 of measured vibration responses 110 in the frequency domain. As discussed with respect to FIG. 1 and FIG. 2, controlled acoustic waves 108 are induced into the ground 106 to induce vibration response 110 in the buried structure 102. The vibration response 110 associated with the structure 102 is conveyed to receiver 112, measured and then analyzed and transformed from the time domain to the frequency domain using an FFT. The resultant FFT frequency-domain spectrums are shown in FIG. 3, with the x-axis representing frequency in Hertz (Hz) and the y-axis representing the magnitude or power (amplitude) of each frequency component, displayed on a logarithmic scale.

The value on the y-axis indicates the strength or intensity of each frequency present in the vibration response, with higher values or peaks on the y-axis indicating stronger frequency components. The dominant peak 308 indicates the highest vibration response measured in structure 102 across the frequency domain.

Figure 4:
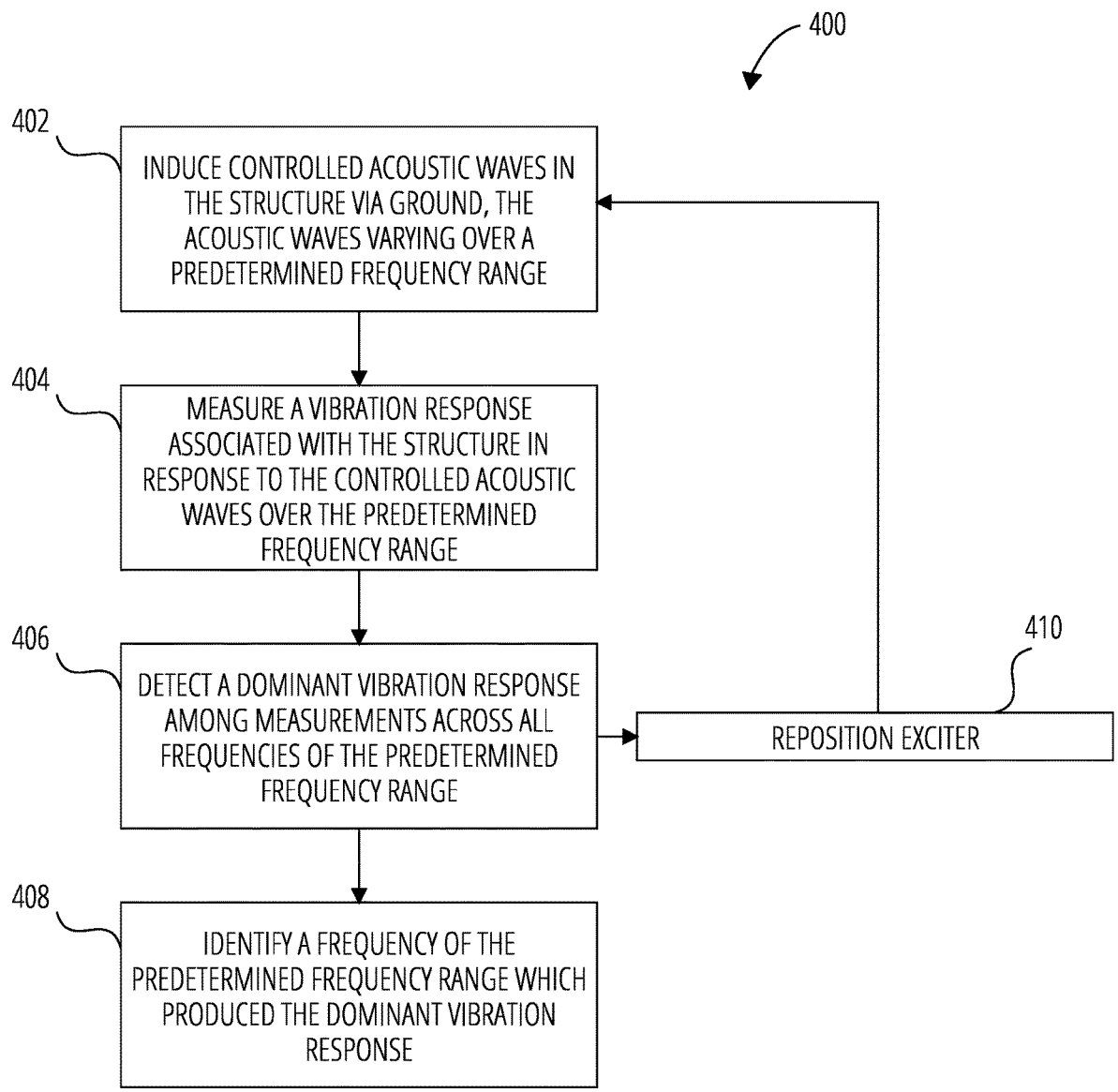
FIG. 4 illustrates a method for identifying a frequency producing a dominant vibration response of an underground structure, in accordance with one aspect; and, FIG. 5 illustrates a method for locating an underground structure, in accordance with one aspect.

In FIG. 4, there is shown a method 400 for identifying frequency producing a dominant vibration response of an underground structure, in accordance with one aspect. Preferably, the underground structure is a pipe, as shown in FIG. 1.

However, method 400 may be used for identifying an optimal frequency for any underground structure.

At block 402, controlled acoustic waves are induced in the structure via ground. The controlled acoustic waves may be induced by an exciter 104 such as that shown in FIG. 1 and previously discussed in relation thereto. This, in turn, induces a vibration response in the underground structure. The controlled acoustic waves vary over a predetermined frequency range.

At block 404, there is measured a vibration response associated with the structure in response to the controlled acoustic waves over the predetermined frequency range, preferably using a measurement device coupled with a receiver in vibrational communication with the structure.

Measurement of the signal strength of the vibration response induced in the underground structure is related to the location of the structure relative to the exciter. The signal strength is inversely proportional to a distance between the exciter and the structure and therefore is at a maximum when the exciter is directly over the structure. As previously mentioned, frequency of the acoustic waves affects the accuracy of location of the structure due to interaction of the acoustic waves with the ground. More specifically, at certain distances between the exciter and the structure, the vibration response can be "flattened", thereby interfering with precise location of the structure. In order to avoid such interference, the exciter varies the acoustic waves over the predetermined frequency range so that the frequency that produces the highest vibration response can be identified. In particular, signal interference can occur at two to three meters above the structure and the exciter sweeps through a frequency range of 30-200 Hz using, for example, a swept sine function or a stepped sine function. In another aspect, a band passed noise source may be used such as white or pink noise filtered to the appropriate frequency range.

At block 406, a dominant vibration response is detected. In one aspect, this is accomplished using a Fourier transform and preferably Fast Fourier Transform (FFT). The vibration signal analyzer 116 digitizes the vibration response measured by measurement device 114. The FFT converts the digitized vibration response measurements from the time domain to the frequency domain and thereby determines component measurements for specific frequencies, including the vibration responses therefor. The frequency-domain vibration responses for each frequency are analyzed to identify the dominant vibration response. In one preferred aspect, the peak vibration responses corresponding with each frequency in the frequency domain are analyzed to identify a highest peak vibration response from among the peak vibration responses as the dominant vibration response. The dominant vibration response values may be instantaneous peak vibration response values at each frequency, for example. From this dominant vibration response, the frequency of the predetermined frequency range which produced the dominant vibration response may be identified. The number of instantaneous peak vibration response values considered in the Fourier transform is determined by a resolution of the Fourier transform. Preferably, the FFT is a high resolution FFT of greater than 1000 bins.

At block 408, there is identified a frequency of the predetermined frequency range which produces the dominant vibration response.

Block 410 illustrates a preferred aspect wherein the exciter is repositioned and the method 400 returns to block 402. In this aspect, the controlled acoustic waves are induced in the structure via ground at a plurality of locations about the structure. The method 400 proceeds to block 406 wherein the dominant vibration response across all frequencies of the predetermined frequency range from all locations of the plurality of locations is detected. Physically repositioning or relocating the exciter about the structure provides detection of a peak vibration response signal which is useful for locating the structure.

Figure 5:
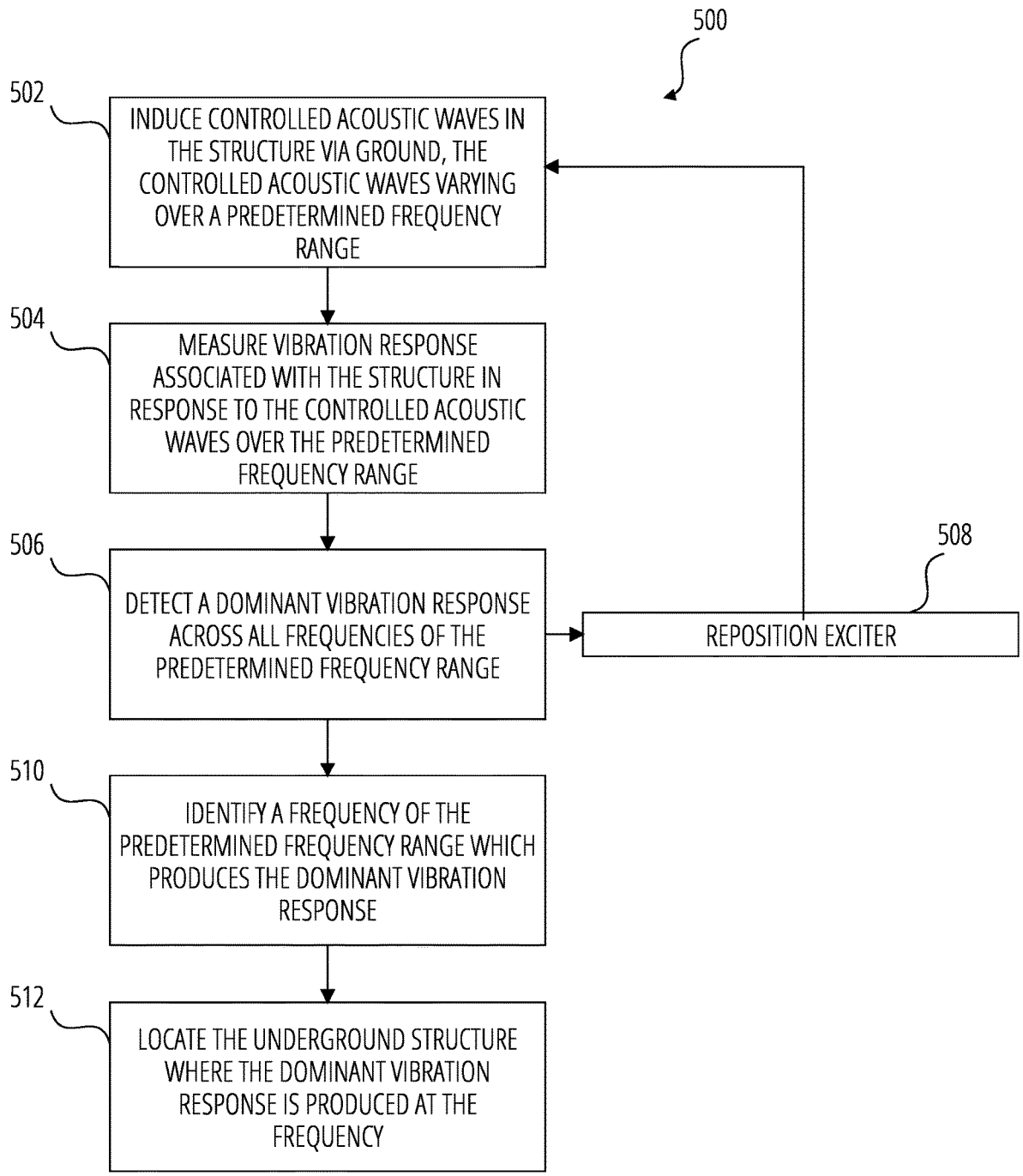

In FIG. 5, there is shown a method 500 for locating an underground structure, according to one aspect.

At block 502 controlled acoustic waves are induced in the structure via ground. The controlled acoustic waves may be induced in any suitable manner previously described. As with previous aspects, the controlled acoustic waves vary over a predetermined frequency range.

At block 504, vibration response associated with the structure in response to the controlled acoustic waves is measured over the predetermined frequency range, preferably using a measurement device coupled with a receiver in vibrational communication with the structure.

At block 506, a dominant vibration response across all frequencies of the predetermined frequency range is detected.

At block 510, there is identified a frequency of the predetermined frequency range which produces the dominant vibration response.

At block 512, the underground structure is located where the dominant vibration response is produced at the frequency. The signal strength of the vibration response induced in the underground structure is related to the location of the structure relative to the exciter. The signal strength is inversely proportional to a distance between the exciter and the structure and therefore is at a maximum when the exciter is directly over the structure. As previously mentioned, frequency of the acoustic waves affects the accuracy of location of the structure due to interaction of the acoustic waves with the ground. More specifically, at certain distances between the exciter and the structure, the vibration response can be "flattened", thereby interfering with precise location of the structure. In order to avoid such interference, the exciter varies the acoustic waves over the predetermined frequency range so that the frequency that produces the highest vibration response can be identified.

Block 508 illustrates a preferred aspect wherein the exciter is repositioned and the method 500 returns to block 502. In this aspect, the controlled acoustic waves are induced in the structure via ground at a plurality of locations about the structure. The method 500 proceeds to block 506 wherein the dominant vibration response across all frequencies of the predetermined frequency range from all locations of the plurality of locations is detected. Physically repositioning or relocating the exciter about the structure provides detection of a peak vibration response signal which is useful for locating the structure.

While the invention has been described in terms of specific aspects, it is apparent that other forms could be adopted by one skilled in the art. For example, the methods described herein could be performed in a manner which differs from the aspects described herein. The steps of each method could be performed using similar steps or steps producing the same result but which are not necessarily equivalent to the steps described herein. Some steps may also be performed in different order to obtain the same result. Similarly, the apparatuses and systems described herein could differ in appearance and construction from the aspects described herein, the functions of each component of the apparatus could be performed by components of different construction but capable of a similar though not necessarily equivalent function, and appropriate materials could be substituted for those noted. Accordingly, it should be understood that the invention is not limited to the specific aspects described herein. It should also be understood that the phraseology and terminology employed above are for the purpose of disclosing the illustrated aspects, and do not necessarily serve as limitations to the scope of the invention.

What is claimed is:

1. A method for identifying a frequency producing a dominant vibration response of an underground structure, comprising the steps of:
   inducing controlled acoustic waves in the structure via ground, the acoustic waves varying over a predetermined frequency range;
   measuring vibration response associated with the structure in response to the controlled acoustic waves over the predetermined frequency range, using a measurement device in vibrational communication with the structure;
   detecting a dominant vibration response among measurements across all frequencies of the predetermined frequency range; and,
   identifying a frequency of the predetermined frequency range which produced the dominant vibration response.

2. The method of claim 1, wherein the underground structure is non-metallic.

3. The method of claim 1, wherein the underground structure is a pipe.

4. The method of claim 1, wherein the acoustic waves vary over the predetermined frequency range by inducing controlled acoustic waves according to at least one of a stepped sine function and a swept sine function.

5. The method of claim 1, wherein the acoustic waves vary over the predetermined frequency range by inducing controlled acoustic waves using a band-passed noise source.

6. The method of claim 1, wherein the controlled acoustic waves are induced using a vibration exciter.

7. The method of claim 1, wherein the vibration response is measured using at least one of a velocity-based vibration sensor and a low-frequency accelerometer.

8. The method of claim 1, wherein the detecting step further comprises:
   converting the vibration response from a time-domain vibration response to a frequency-domain vibration response by applying a Fourier transform; and,
   analyzing the frequency-domain vibration response to identify the dominant vibration response.

9. The method of claim 8, wherein the analyzing step further comprises:
   analyzing peak vibration responses corresponding with each frequency in the frequency-domain; and,
   identifying a highest peak vibration response from among the peak vibration responses as the dominant vibration response.

10. The method of claim 9, wherein the dominant vibration response values are instantaneous peak vibration response values at each frequency.

11. The method of claim 10, wherein a number of instantaneous peak vibration response values considered in the Fourier transform is determined by a resolution of the Fourier transform.

12. The method of claim 1, further comprising the steps of:
   repositioning the exciter; and,
   returning to the inducing step, wherein the inducing step further comprises inducing controlled acoustic waves in the structure via ground at a plurality of locations about the structure, and, the detecting step further comprises detecting the dominant vibration response across all frequencies of the predetermined frequency range from all locations of the plurality of locations.

13. A system for identifying a frequency producing a dominant vibration response of an underground structure, comprising:
   an exciter for inducing in the structure, via ground, controlled acoustic waves which vary over a predetermined frequency range;
   a measurement device in vibrational communication with the structure for measuring vibration response associated with the structure in response to the controlled acoustic waves over the predetermined frequency range; and,
   a vibration signal analyzer for detecting a dominant vibration response across all frequencies of the predetermined frequency range and identifying a frequency of the predetermined frequency range which produces the dominant vibration response.

14. The system of claim 13, wherein the vibration signal analyzer converts the vibration response from a time-domain vibration response to a frequency-domain vibration response by applying a Fourier transform and analyzes the frequency-domain vibration response to identify the dominant vibration response.

15. The system of claim 14, wherein the frequency-domain vibration responses include peak vibration responses corresponding with each frequency in the frequency-domain which are analyzed to identify a highest peak vibration response from among the peak vibration responses as the dominant vibration response.

16. The system of claim 15, wherein the dominant vibration response values are instantaneous peak vibration response values at each frequency.

17. The system of claim 16, wherein a number of instantaneous peak vibration response values considered in the Fourier transform is determined by a resolution of the Fourier transform.

18. The system of claim 13, wherein the exciter is repositionable for inducing controlled acoustic waves in the structure via ground at a plurality of locations about the structure, and, the vibration signal analyzer detects the dominant vibration response across all frequencies of the predetermined frequency range from all locations of the plurality of locations.

19. A method for locating an underground structure, comprising the steps of:
   inducing, at a plurality of locations about the structure, controlled acoustic waves in the structure via ground, the controlled acoustic waves varying over a predetermined frequency range;
   measuring vibration response associated with the structure in response to the controlled acoustic waves over the predetermined frequency range, using a measurement device in vibrational communication with the structure;

detecting a dominant vibration response across all frequencies of the predetermined frequency range from all locations of the plurality of locations;

identifying a frequency of the predetermined frequency range which produces the dominant vibration response; and, locating the underground structure as at a location of the plurality of locations where the dominant vibration response is produced at the frequency.

20. The method of claim 19, wherein the detecting step further comprises:

converting the vibration response from a time-domain vibration response to a frequency-domain vibration response by applying a Fourier transform; and, analyzing the frequency-domain vibration response to identify the dominant vibration response.

21. The method of claim 20, wherein the analyzing step further comprises:

analyzing peak vibration responses corresponding with each frequency in the frequency-domain; and, identifying a highest peak vibration response from among the peak vibration responses as the dominant vibration response.

22. The method of claim 21, wherein the dominant vibration response values are instantaneous peak vibration response values at each frequency.

23. The method of claim 22, wherein a number of instantaneous peak vibration response values considered in the Fourier transform is determined by a resolution of the Fourier transform.

* * * * *